Patented Apr. 28, 1953

2,636,244

UNITED STATES PATENT OFFICE 2,636,244

MANUFACTURE OF REFRACTORY ARTICLES

Albert Etheridge Williams, Strand, London, England

No Drawing. Application August 16, 1950, Serial No. 179,890. In Great Britain August 19, 1949

6 Claims. (Cl. 25—156)

This invention relates to the manufacture of refractory articles from magnesia and is particularly concerned with the methods of manufacturing such articles from pure magnesium oxide.

Commercially available magnesia ware is of fused material generally containing about 96 per cent magnesium oxide, the remainder being chiefly silica. The physical properties of such ware are poor, thin walled crucibles being very friable. In addition the ware has not the requisite chemical inertness to be used for melting highly reactive metals, for example uranium.

Preparation of magnesia ware from raw material of higher purity, for example 99 per cent magnesium oxide by usual methods of slip-casting is not practical since a suitable slip cannot be prepared either by employment of water acidified with hydrochloric acid owing to the basicity of the oxide or by the use of water owing to the formation of magnesium hydroxide which causes the cast to crack.

The object of the invention is to provide a simple and satisfactory process of preparing magnesia ware from pure magnesium oxide by a slip-casting method.

In accordance with the invention ground magnesium oxide of at least 98 per cent and preferably approximately 99 per cent purity is formed into a slip for casting by admixture with a lower aliphatic alcohol in quantity sufficient to make a flowing suspension. The resulting slip may be cast, dried and fired at a sintering temperature.

The preferred alcohol is ethyl alcohol which gives a slip of high shear strength, which pours well and shrinks away from a plaster mould. Methyl alcohol forms a slip which is not so easily cast and isopropyl and butyl alcohols form slips of increased viscosity and slower in drying as compared with that prepared with ethyl alcohol.

The slip should contain from 85 to 93 per cent of magnesia and preferably 90 per cent magnesia. For most satisfactory slip formation calcined pure magnesia should be ground so that 60 per cent of the particles have a size less than 5 microns. Finer or coarser magnesia not greatly different from the above will also furnish satisfactory slips but magnesia containing less than 60 per cent of particles below 9 microns in size or more than 60 per cent of particles below 3.5 microns in size have not been found satisfactory.

The presence of water in the alcohol employed for preparing slips has a marked effect on the slip. Thus more than one per cent of water resulted in a creamy slip, the cast articles from which frequently cracked in the moulds and always cracked at the firing stage.

The magnesia casts produced according to the invention are preferably pre-fired, for example in an electric muffle furnace, care being taken to heat the article uniformly. The rate of heating to 150° C. is desirably slow (approximately half an hour from room temperature) and then at a rate of about 500° C. per hour to at least 1000° C. The preferred final temperature is 1200° C. The highest temperature is preferably maintained for 15 minutes and the article is allowed to cool in the furnace.

Sintering may be effected in a gas fired kiln at 1500° C. to 1800° C. preferably the latter temperature, since articles sintered at 1500° C. are very porous. Firing may also be carried out at temperatures between 1500° C. and 2000° C. in a graphite tube furnace. It has been observed, in this connection, that magnesia, which has been ground with iron balls, (resulting in a contamination of about 0.15 per cent iron), when fired in graphite at 2000° C. gives a white iron-free product, the iron being removed by evaporation.

The firing operation is desirably carried out by heating to 1000° C. in 20 minutes and to the firing temperature in 30 minutes. The firing temperature may be maintained for 15 minutes for crucibles and light ware. Slow cooling is essential to avoid cracks, about two hours to reach room temperature being generally desirable.

The following is a preferred way of carrying the invention into effect as applied by way of example to the production of magnesia crucibles.

Pure magnesia containing 98.8 per cent magnesium oxide was calcined in clay crucibles at 1500° C. and dry ground in a ball mill lined with polyvinyl chloride plastic, using sintered magnesia balls. Grinding was continued until the powder contained substantially 60 per cent of particles less than 5 microns in size, a grinding period of 8 hours being found necessary for the particular mill and speed of operation. The powder analysed approximately as follows:

10 per cent less than $2\mu$, 20 per cent less than $3\mu$,
40 per cent less than $4\mu$, 60 per cent less than $5\mu$,
80 per cent less than $8\mu$, 90 per cent less than $11\mu$.

The ground magnesia was formed into a slip with absolute ethyl alcohol, 90 per cent magnesia being present in the prepared slip. The slip was cast in a plaster crucible mould. After a partial drying the cast shrank away from the mould, was removed and the alcohol was allowed to evaporate.

The dried casts were pre-fired as described above and sintered in a gas fired furnace at substantially 1800° C. for half an hour. They showed a linear shrinkage of 8.4 per cent and had a density of 3.4 gm./cc. and a porosity of 10.2 per cent.

Crucibles prepared by sintering the dried castings in a graphite tube furnace at 2000° C. had a density of 3.1 gm./cc., a porosity of 15 per cent and showed a linear shrinkage of 7.0 per cent.

The term "pure magnesium oxide" used in the present specification and claims signifies a magnesium oxide containing at least 98 per cent magnesium oxide.

I claim:

1. A process for the production of refractory articles of magnesia, wherein ground pure magnesium oxide is formed into a slip by admixture with an anhydrous lower aliphatic alcohol up to butyl alcohol in quantity sufficient to make a flowing suspension, the slip is cast in a porous mould and the dried cast is subsequently fired at a sintering temperature.

2. The step in the process of producing refractory articles of magnesia which consists in forming a slip by incorporating pure magnesium oxide in an anhydrous lower aliphatic alcohol up to butyl alcohol in quantity to make a flowing suspension.

3. A process for the production of a cast of magnesium oxide for firing to yield magnesia ware, which process comprises forming ground magnesium oxide into a slip by admixture therewith of an anhydrous lower aliphatic alcohol up to butyl alcohol, preferably ethyl alcohol, in quantity sufficient to make a flowing suspension, casting the slip in a porous mould and allowing the cast to dry.

4. A process of producing refractory articles of magnesia, wherein ground pure magnesium oxide is formed into a slip by admixture of anhydrous ethyl alcohol in amount to give a slip containing from 85 to 93 per cent by weight of magnesium oxide, the slip is cast in a porous mould, and the dried cast is sintered by firing at from 1500° to 2000° C.

5. A process of producing refractory articles of magnesia, wherein ground pure magnesium oxide is formed into a slip by admixture of anhydrous ethyl alcohol in amount of from 7 to 15 per cent by weight of the slip, the magnesium oxide having a particle size such that not less than 60 per cent is below 9 microns in size and not more than 60 per cent is below 3.5 microns in size, the slip is cast in a porous mould and the dried cast is sintered by firing at from 1500° to 2000° C.

6. The step in the process of producing refractory articles of magnesia, which consists in forming a slip by incorporating pure magnesium oxide in anhydrous ethyl alcohol, the former being present to the extent of 85 to 93 per cent by weight of the slip.

ALBERT ETHERIDGE WILLIAMS.

References Cited in the file of this patent

UNITED STATES PATENTS

| Number | Name | Date |
|---|---|---|
| 1,756,736 | Goldschmidt et al. | Apr. 29, 1930 |
| 2,031,129 | Reichmann | Feb. 18, 1936 |
| 2,299,374 | Bickford | Oct. 20, 1942 |
| 2,468,458 | Padmos et al. | Apr. 26, 1949 |